United States Patent
Shihaku et al.

(10) Patent No.: US 10,473,928 B2
(45) Date of Patent: Nov. 12, 2019

(54) BACKLIGHT UNIT AND HEAD-UP DISPLAY DEVICE

(71) Applicant: Yazaki Corporation, Tokyo (JP)

(72) Inventors: Jun Shihaku, Shizuoka (JP); Kenji Koizumi, Shizuoka (JP); Naohisa Murata, Shizuoka (JP); Noriaki Narushima, Shizuoka (JP); Kazuki Kubota, Shimada (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/464,475

(22) Filed: Mar. 21, 2017

(65) Prior Publication Data
US 2017/0276936 A1    Sep. 28, 2017

(30) Foreign Application Priority Data

Mar. 22, 2016    (JP) .................. 2016-057040

(51) Int. Cl.
   *G02B 27/14*    (2006.01)
   *G02B 27/01*    (2006.01)
   *B60K 35/00*    (2006.01)

(52) U.S. Cl.
   CPC .......... *G02B 27/0101* (2013.01); *B60K 35/00* (2013.01); *B60K 2370/155* (2019.05); *B60K 2370/334* (2019.05); *B60K 2370/34* (2019.05); *B60K 2370/52* (2019.05); *B60K 2370/77* (2019.05); *G02B 2027/0118* (2013.01)

(58) Field of Classification Search
   CPC ......... G02F 1/133603; G02F 1/133611; G02F 2001/133607; G02F 1/07; G02F 1/133526; G02F 1/135; G02F 1/29
   USPC .................................. 359/619–636
   See application file for complete search history.

(56) References Cited

U.S. PATENT DOCUMENTS

| | | | |
|---|---|---|---|
| 2007/0064174 A1 | 3/2007 | Kitamura et al. | |
| 2012/0257267 A1* | 10/2012 | Imai | G02B 26/105 359/201.1 |
| 2014/0063359 A1* | 3/2014 | Chen | G02B 27/0101 349/11 |

(Continued)

FOREIGN PATENT DOCUMENTS

| | | |
|---|---|---|
| EP | 2990250 A1 | 3/2016 |
| JP | 2007-108429 A | 4/2007 |

(Continued)

OTHER PUBLICATIONS

Communication dated Apr. 3, 2018 from the Japanese Patent Office in corresponding application No. 2016-057040.

(Continued)

*Primary Examiner* — Brandi N Thomas
(74) *Attorney, Agent, or Firm* — Sughrue Mion, PLLC

(57) ABSTRACT

A backlight unit includes a light source; a condensing unit that condenses light emitted from the light source; and a diverging unit that diverges the light entering from the condensing unit and that emits the light toward an image display unit of a light transmission type in a head-up display device. For example, the diverging unit is a lens in which both surfaces of an incident surface into which the light from the condensing unit enters as well as an emission surface from which the light is emitted toward the image display unit, are concave surfaces.

8 Claims, 13 Drawing Sheets

(56) References Cited

U.S. PATENT DOCUMENTS

2016/0086305 A1    3/2016   Watanabe

FOREIGN PATENT DOCUMENTS

| | | |
|---|---|---|
| JP | 2007087792 A | 4/2007 |
| JP | 2009169399 A | 7/2009 |
| JP | 2016218391 A | 12/2016 |

OTHER PUBLICATIONS

Communication issued by the French Republic National Institute for Industrial Property dated Oct. 24, 2018 in copending application No. 1752357.

* cited by examiner though the display device disclosed in Japanese Patent Application Laid-open No. 2007-108429 can reduce luminance unevenness of transmitted illumination light by the diffusion plate, while preventing a luminance reduction in the transmitted illumination light by the first condensing lens.
BACKLIGHT UNIT AND HEAD-UP DISPLAY DEVICE

CROSS-REFERENCE TO RELATED APPLICATION(S)

The present application claims priority to and incorporates by reference the entire contents of Japanese Patent Application No. 2016-057040 filed in Japan on Mar. 22, 2016.

BACKGROUND OF THE INVENTION

1. Field of the Invention

The present invention relates to a backlight unit and a head-up display device.

2. Description of the Related Art

Conventionally, there has been a head-up display device including a backlight. For example, Japanese Patent Application Laid-open No. 2007-108429 discloses a technology of a display device provided with a display part that displays desired information by being transmissively illuminated; a light source that is disposed at the rear of the display part and that transmissively illuminates the display part; a diffusion plate that uniformizes the light emitted from the light source; and a first condensing lens that condenses the light made uniform by the diffusion plate on the display part, and that transmissively illuminates the display part. It is described that the display device disclosed in Japanese Patent Application Laid-open No. 2007-108429 can reduce luminance unevenness of transmitted illumination light by the diffusion plate, while preventing a luminance reduction in the transmitted illumination light by the first condensing lens.

It is possible to improve luminance of an image by concentrating projection light on a certain range, by condensing the light from a light source using a condensing lens. On the other hand, when an eye point is changed due to a change of posture of the driver or the like, luminance of an image to be viewed may be varied.

SUMMARY OF THE INVENTION

The object of the present invention is to provide a backlight unit and a head-up display device that can prevent luminance variation in an image due to a change in an eye point.

In order to achieve the above mentioned object, a backlight unit according to one aspect of the present invention includes a light source; a condensing unit configured to condense light emitted from the light source; and a diverging unit configured to diverge and emit the light entering from the condensing unit toward a light-transmission type image display unit in a head-up display device.

According to another aspect of the present invention, in the backlight unit, it is preferable that the diverging unit is a lens in which at least one of an incident surface that the light from the condensing unit enters and an emission surface from which the light is emitted toward the image display unit, is a concave surface.

According to still another aspect of the present invention, in the backlight unit, it is preferable that the diverging unit is a lens in which both surfaces of an incident surface that the light from the condensing unit enters as well as an emission surface from which the light is emitted toward the image display unit, are concave surfaces.

According to still another aspect of the present invention, in the backlight unit, it is preferable that the diverging unit diverges the light at least in a direction corresponding to a vehicle width direction in the image display unit.

According to still another aspect of the present invention, in the backlight unit, it is preferable that the diverging unit diverges the light in a lateral direction that is a direction corresponding to a vehicle width direction, and a longitudinal direction that is a direction corresponding to a vehicle height direction, in the image display unit; and a degree of divergence of the light diverged by the diverging unit in the lateral direction is larger than a degree of divergence of the light diverged by the diverging unit in the longitudinal direction.

According to still another aspect of the present invention, a head-up display device includes a light-transmission type image display unit configured to display an image; a light source; a condensing unit configured to condense light emitted from the light source; and a diverging unit configured to diverge and emit the light entering from the condensing unit toward the image display unit, wherein the image is projected on a light reflecting unit in front of a driver's seat with the light emitted from the diverging unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a backlight unit and a head-up display device according to an embodiment of the present invention will be described in detail with reference to the accompanying drawings. It is to be understood that the present invention is not limited to the embodiment. Furthermore, components of the following embodiment include components that can be easily conceived by a person skilled in the art and components substantially the same.

Embodiment

Figure 1:
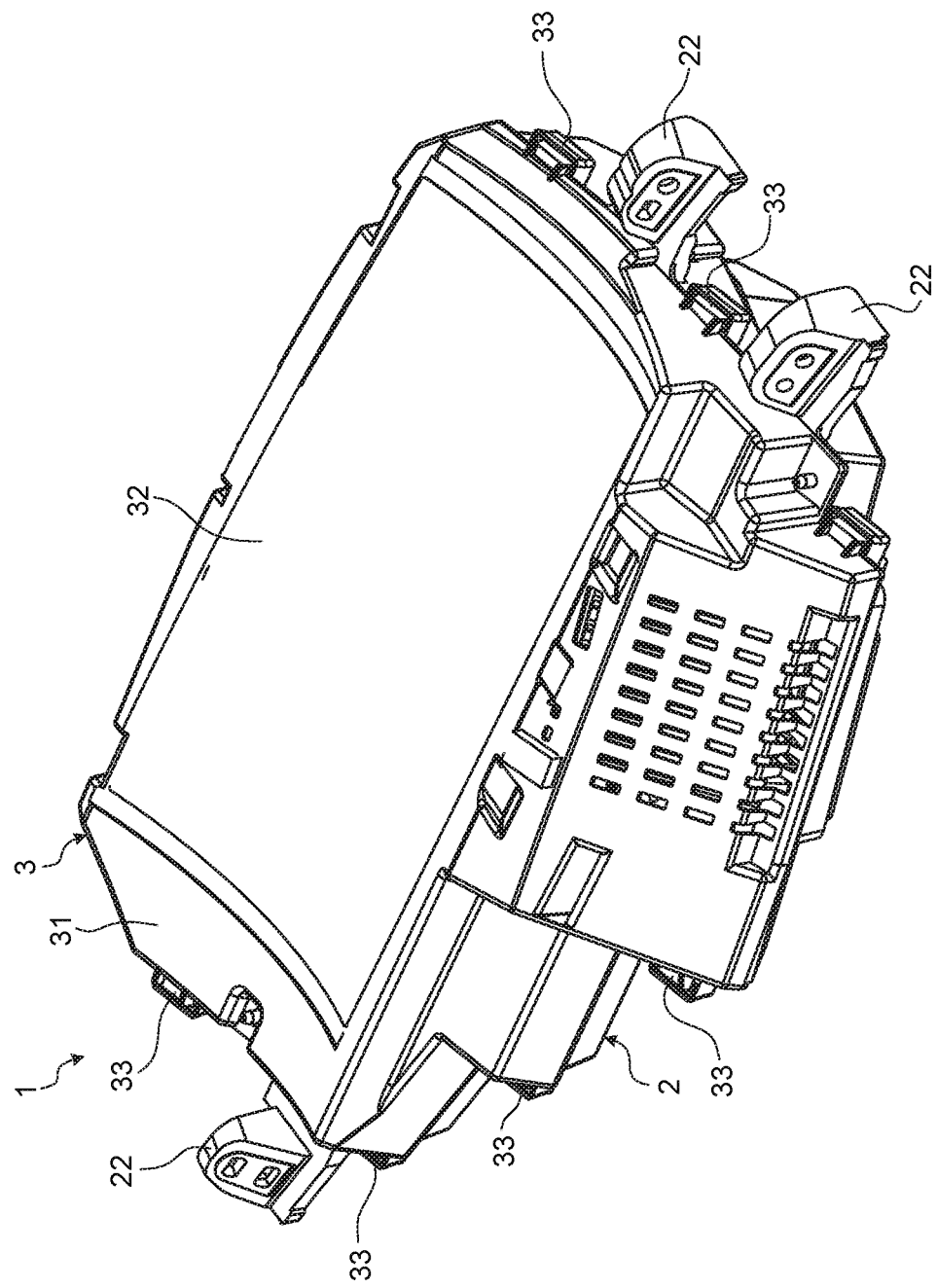
FIG. 1 is a perspective view of a head-up display device according to an embodiment.
Figure 2:
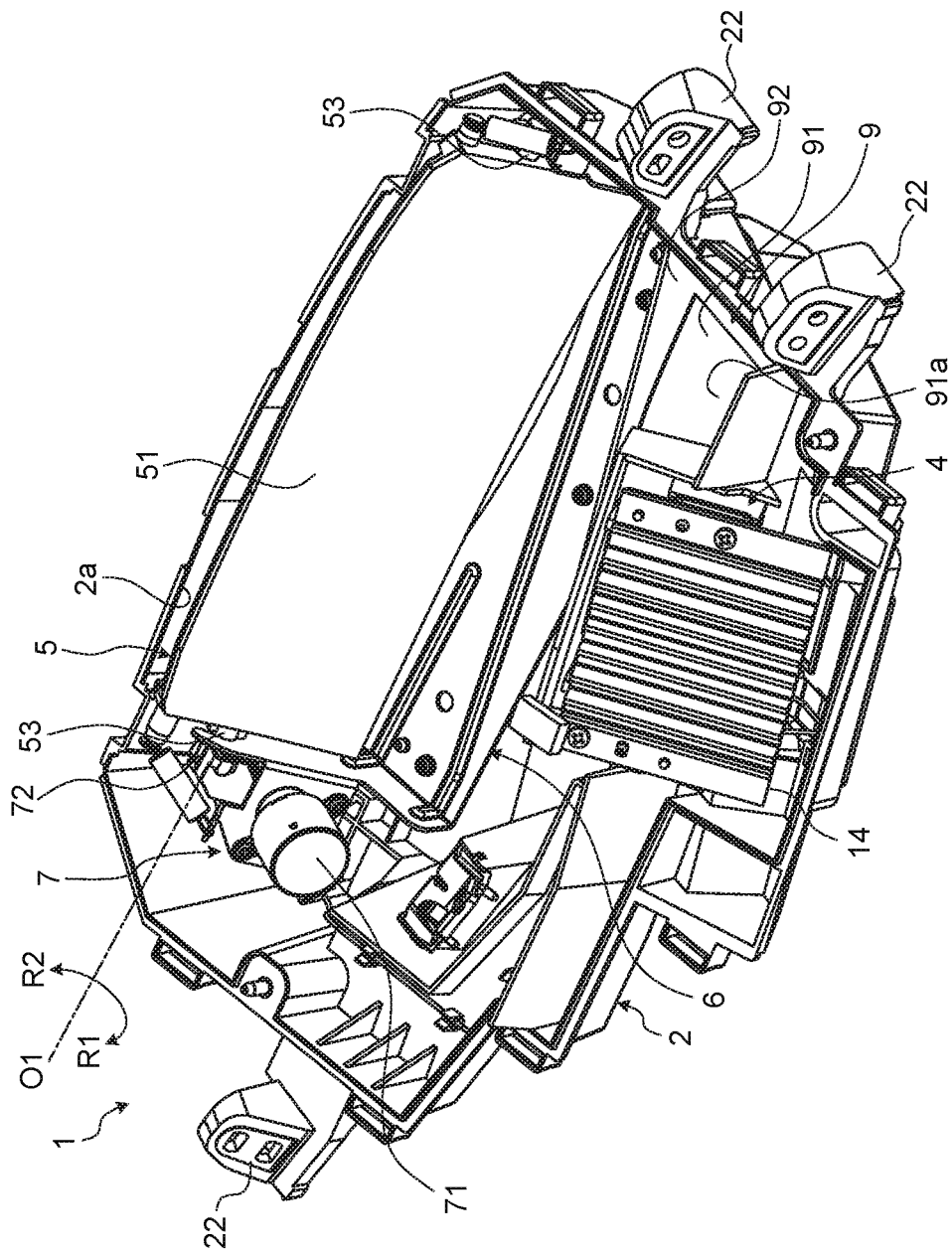
FIG. 2 is a perspective view illustrating the inside of the head-up display device according to the embodiment.
Figure 3:
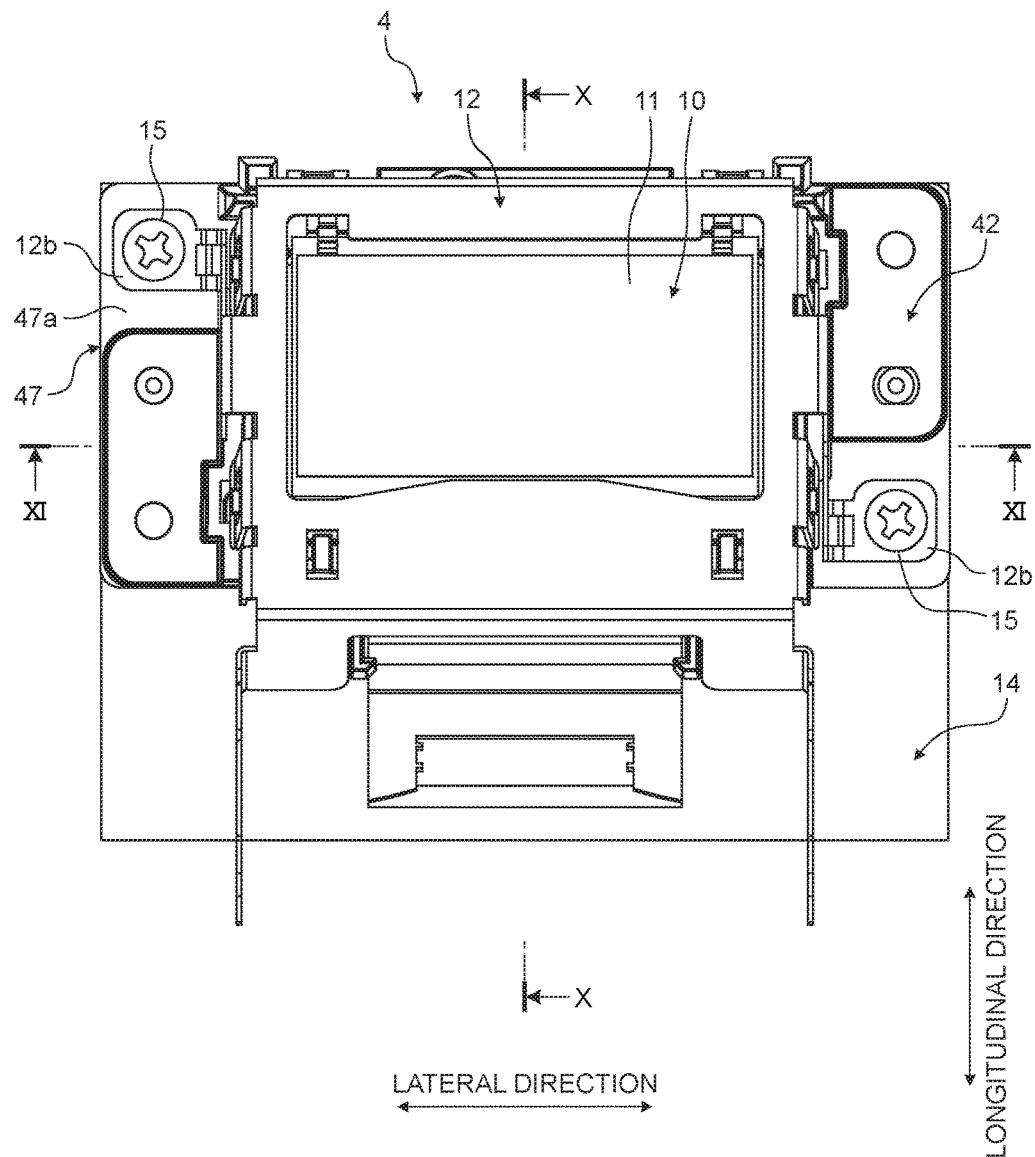
FIG. 3 is a plan view of a projection light emission unit according to the embodiment.
Figure 4:
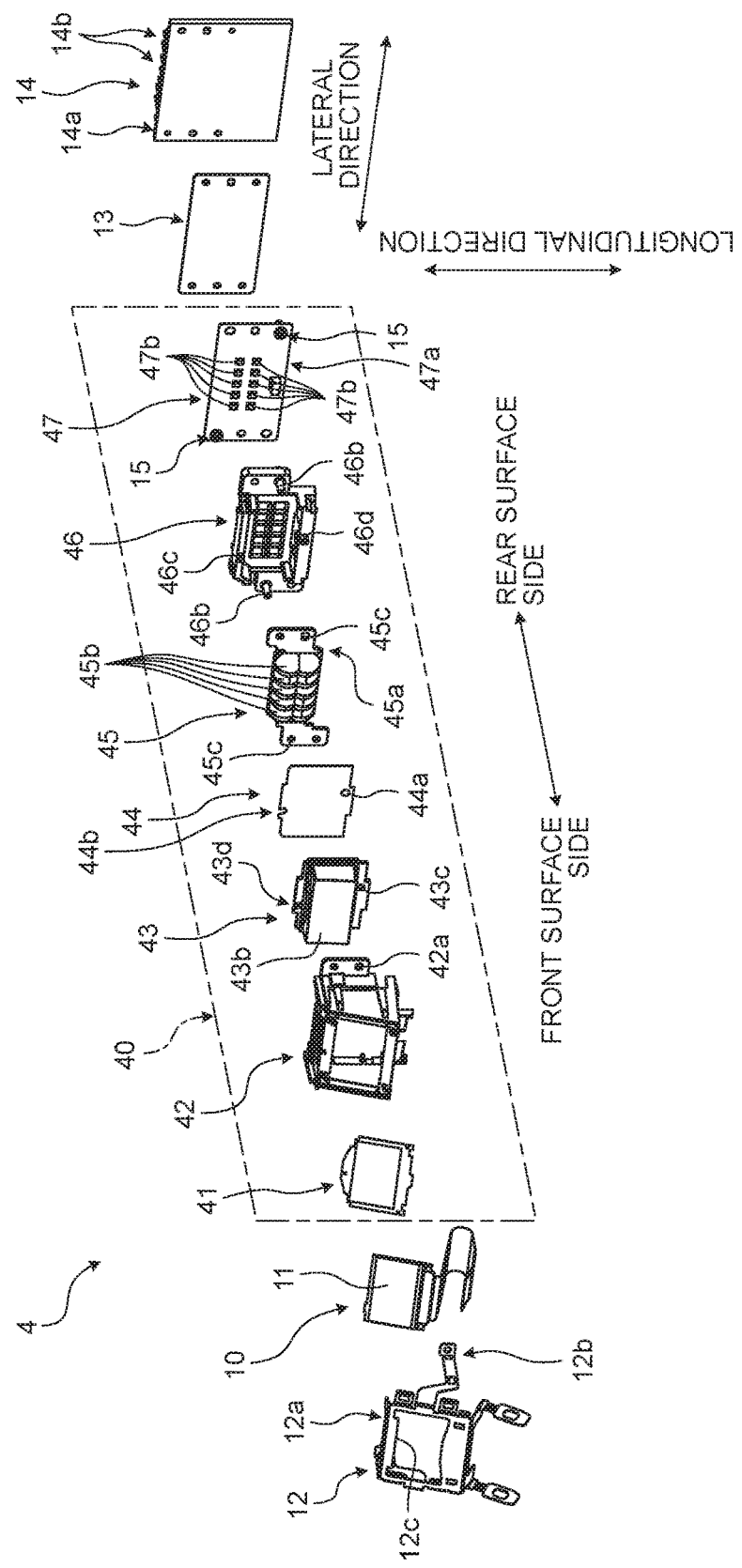
FIG. 4 is an exploded perspective view of the projection light emission unit according to the embodiment.
Figure 5:
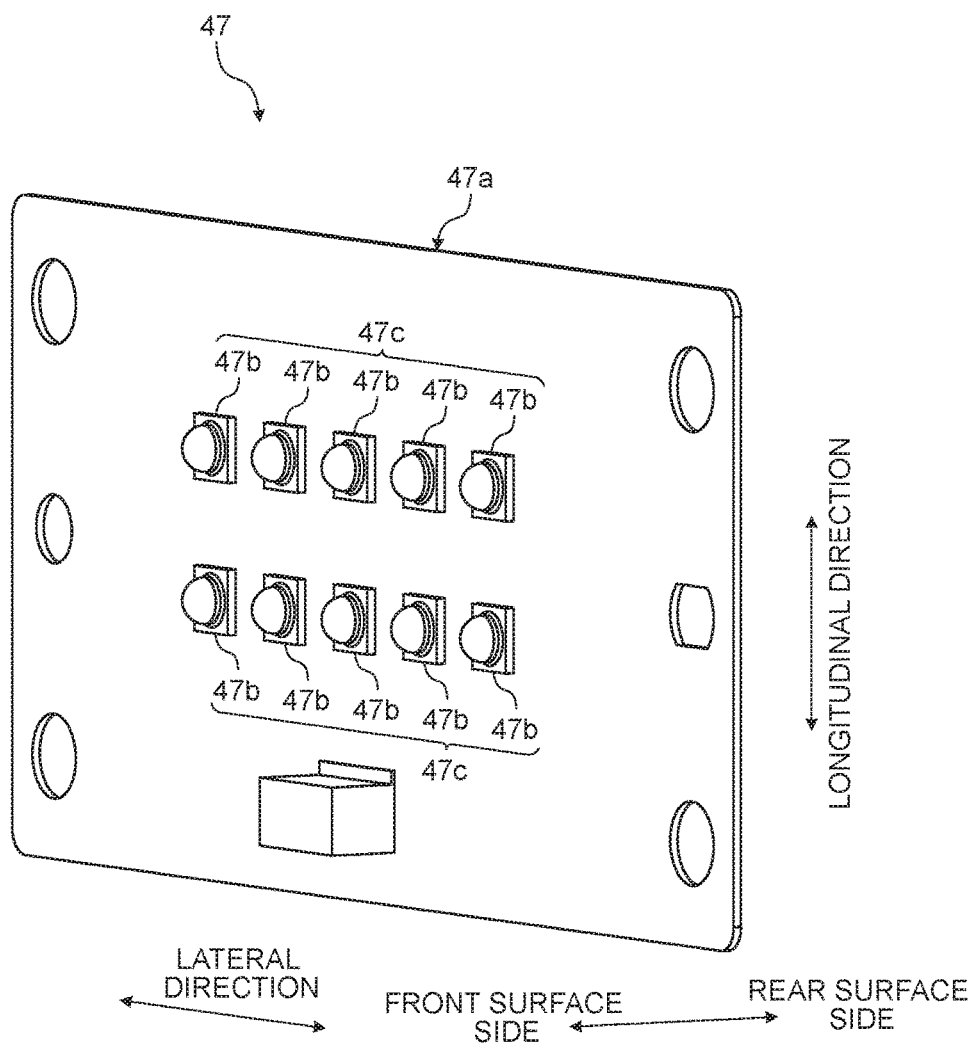
FIG. 5 is a perspective view of a light source unit according to the embodiment.
Figure 6:
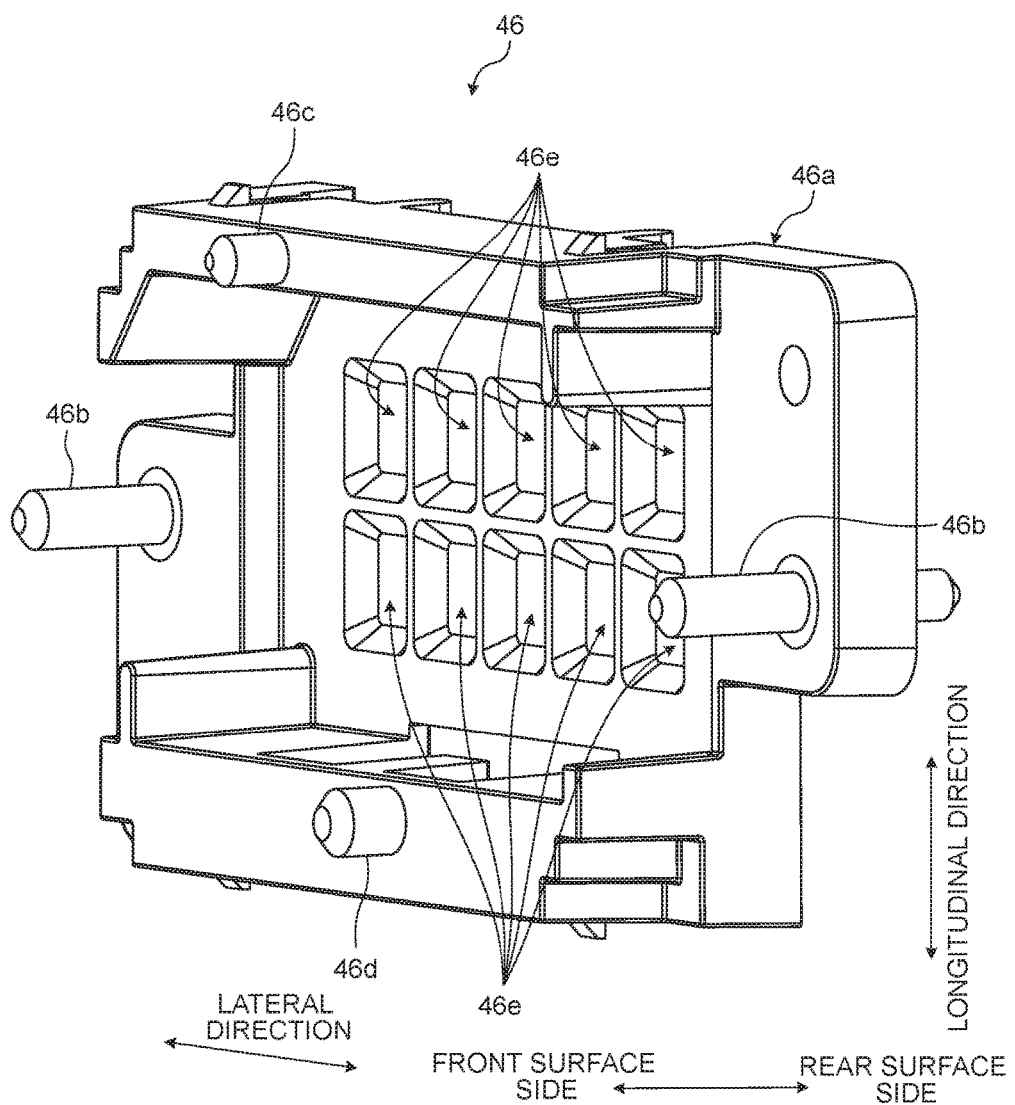
FIG. 6 is a perspective view of a holding member according to the embodiment.
Figure 7:
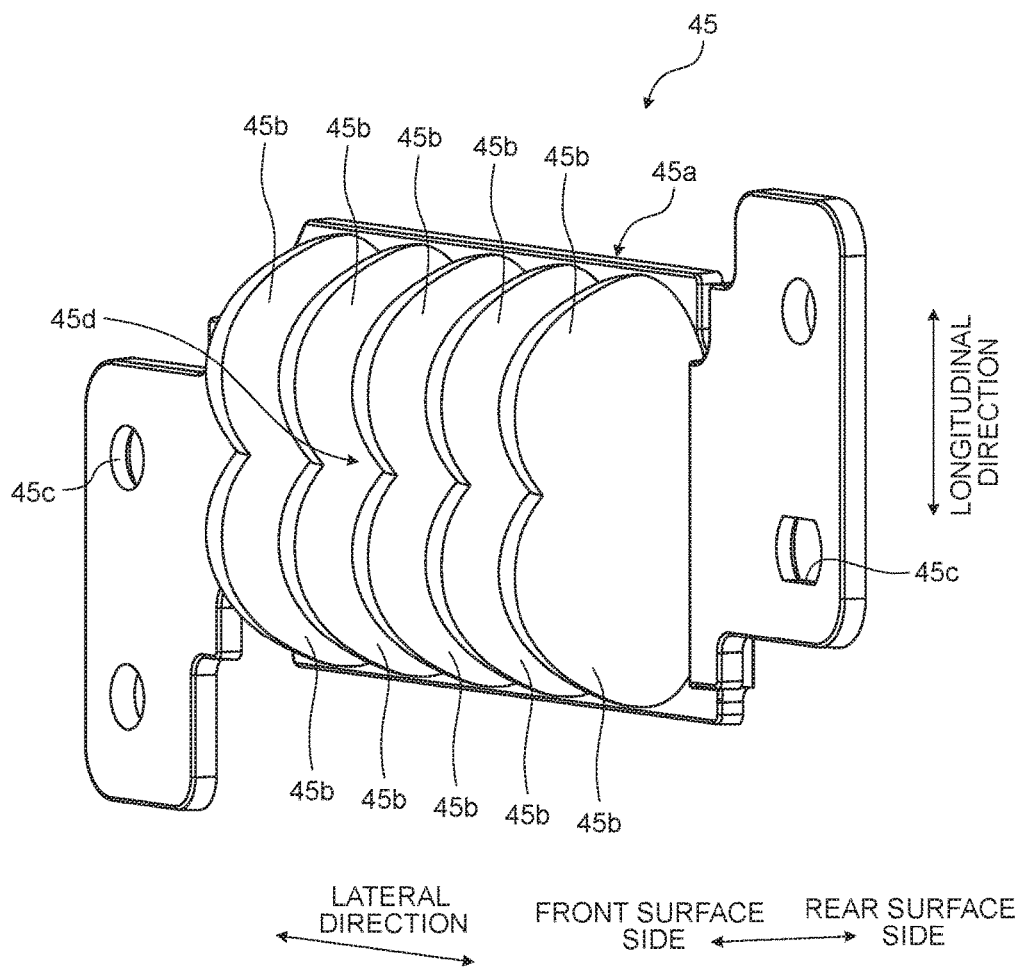
FIG. 7 is a perspective view of a condensing lens according to the embodiment.
Figure 8:
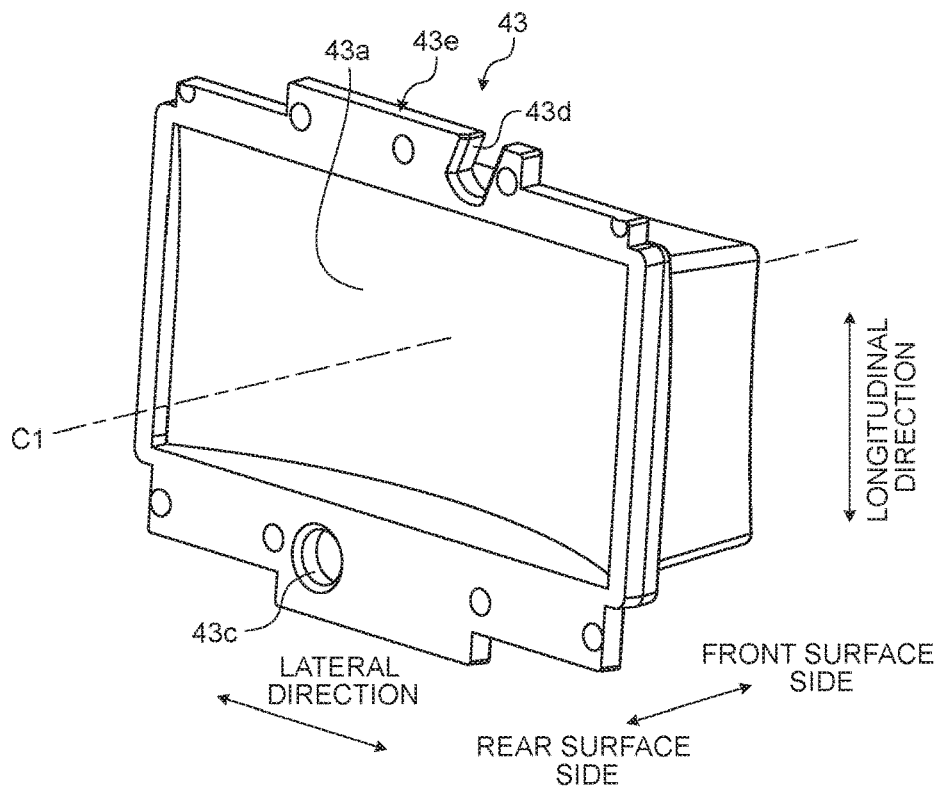
FIG. 8 is a perspective view of a rear surface side of a diverging lens according to the embodiment.
Figure 9:
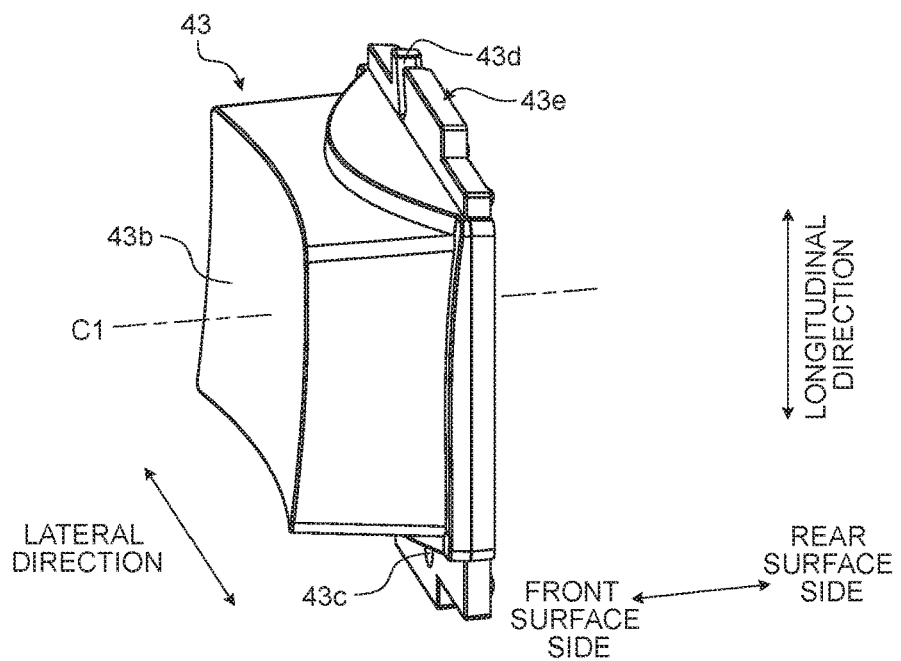
FIG. 9 is a perspective view of a front surface side of the diverging lens according to the embodiment.
Figure 10:
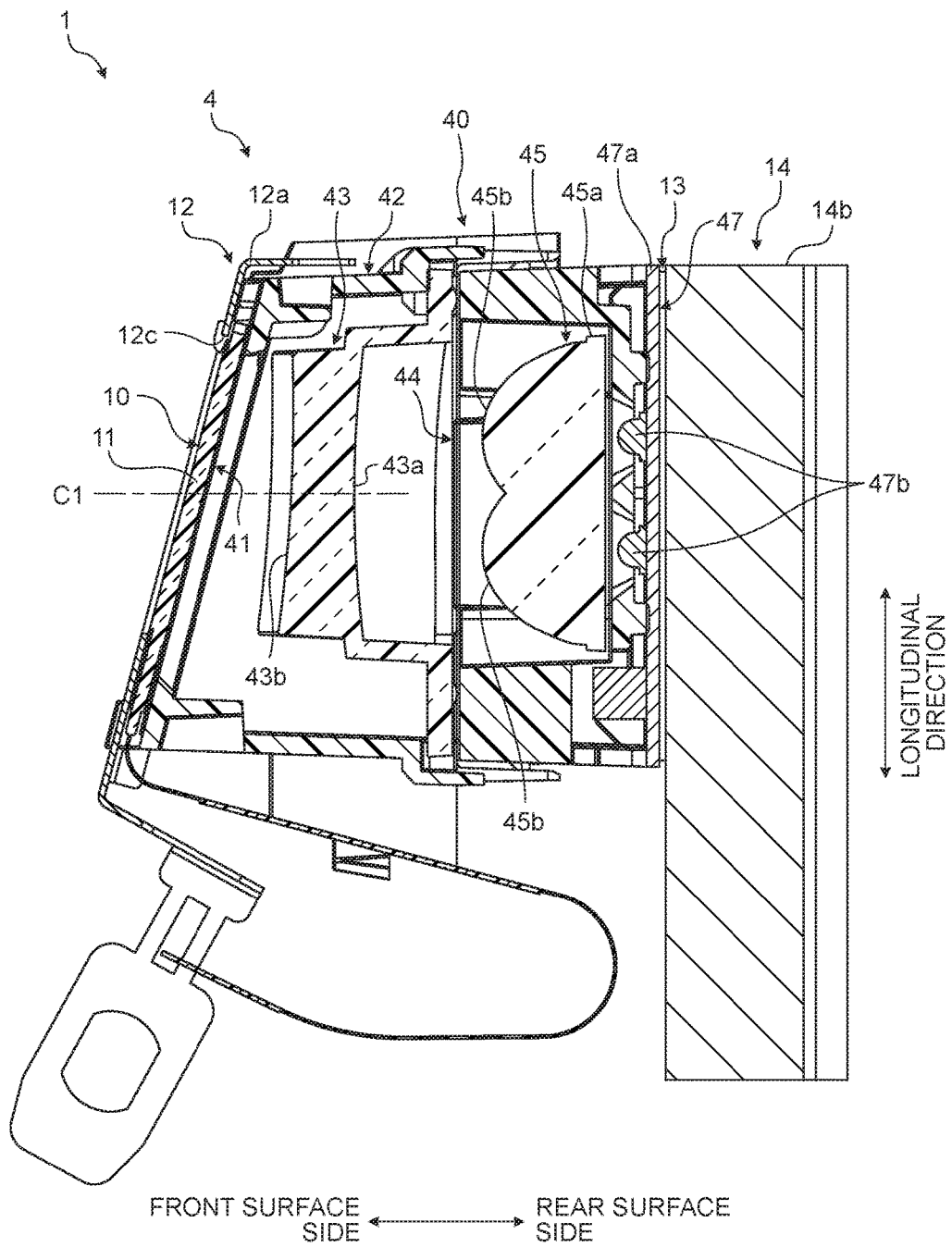
FIG. 10 is a longitudinal sectional view of the projection light emission unit according to the embodiment.
Figure 11:
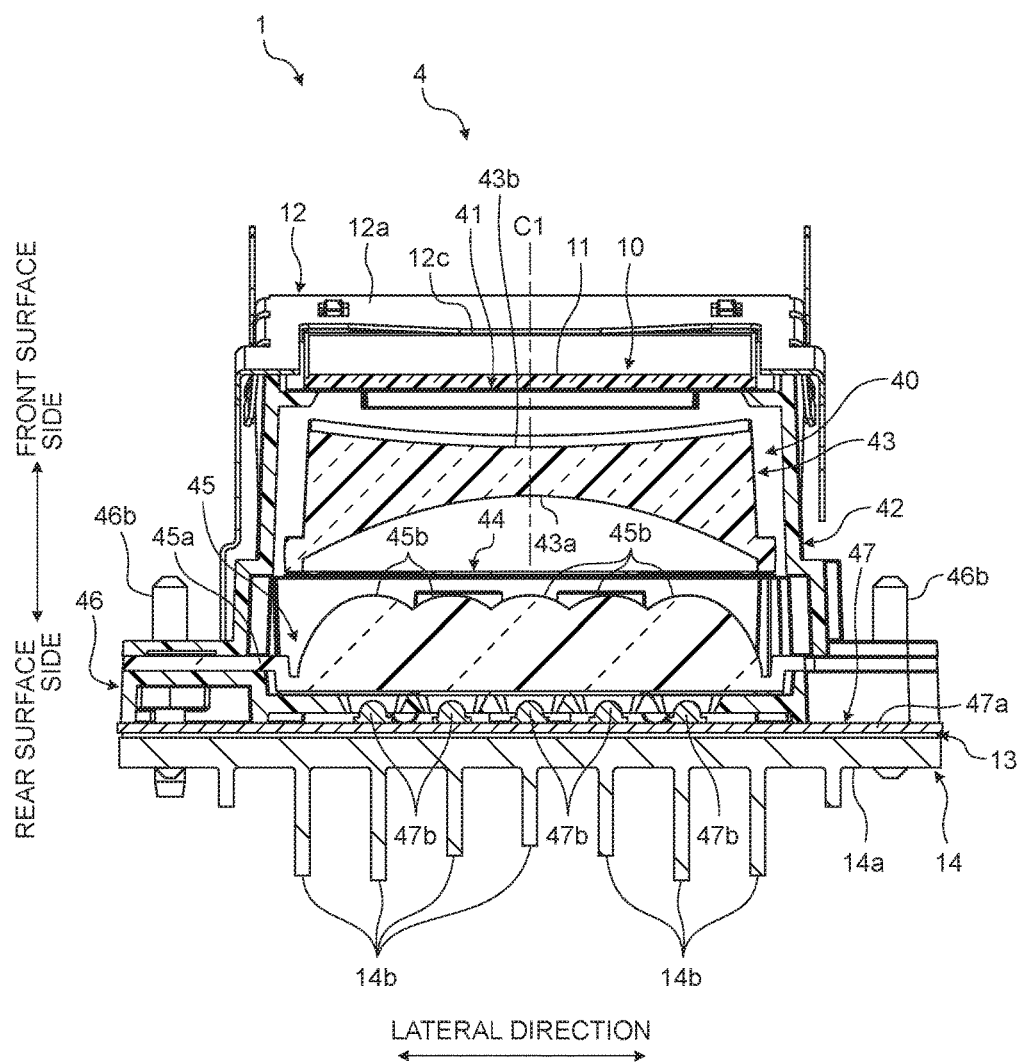
FIG. 11 is a lateral sectional view of the projection light emission unit according to the embodiment.

An embodiment will now be described with reference to FIG. 1 to FIG. 15. The present embodiment relates to a backlight unit and a head-up display device. FIG. 1 is a perspective view of a head-up display device according to the embodiment. FIG. 2 is a perspective view illustrating the inside of the head-up display device according to the embodiment. FIG. 3 is a plan view of a projection light emission unit according to the embodiment. FIG. 4 is an exploded perspective view of the projection light emission unit according to the embodiment. FIG. 5 is a perspective view of a light source unit according to the embodiment. FIG. 6 is a perspective view of a holding member according to the embodiment. FIG. 7 is a perspective view of a condensing lens according to the embodiment. FIG. 8 is a perspective view of a rear surface side of a diverging lens according to the embodiment. FIG. 9 is a perspective view of a front surface side of the diverging lens according to the embodiment. FIG. 10 is a sectional view taken along a line X-X in FIG. 3, and a longitudinal sectional view of the projection light emission unit according to the embodiment. FIG. 11 is a sectional view taken along a line XI-XI in FIG. 3, and a lateral sectional view of the projection light emission unit according to the embodiment.

A head-up display device 1 (hereinafter, simply referred to as a "HUD 1") according to the present embodiment is to be mounted on a vehicle, which is not illustrated. The HUD 1 projects projection light toward a light reflecting unit 8 (see FIG. 12) in front of a driver's seat of the vehicle. For example, the light reflecting unit 8 is a semi-transmission unit that reflects a part of incident light and that transmits a part of the incident light, such as a windshield and a combiner. The HUD 1 is accommodated inside of an instrument panel of the vehicle. The HUD 1 includes a transmission unit that is formed at a position facing the light reflecting unit 8, and the HUD 1 projects projection light toward the light reflecting unit 8 via the transmission unit.

As illustrated in FIG. 1 and FIG. 2, the HUD 1 includes a casing 2, a cover 3, a projection light emission unit 4, a reflecting member 5, a supporting member 6, and a planar mirror 9. The casing 2 is to be fixed to the vehicle. The casing 2 accommodates therein the projection light emission unit 4, the reflecting member 5, the supporting member 6, a rotation power generating mechanism 7, and the planar mirror 9. The casing 2 is formed of a synthetic resin, and includes an opening 2a that faces the upper side of the vehicle. The casing 2 includes a fixing unit 22. The fixing unit 22 is fixed to the instrument panel and the like of the vehicle, using a fixing member such as a bolt.

The cover 3 closes the opening 2a of the casing 2. The cover 3 is a lid-like member, and includes a main body unit 31 and a transmission unit 32. The main body unit 31 is formed of a synthetic resin. The main body unit 31 is engaged to the casing 2 by an engagement mechanism 33. The transmission unit 32 is formed of a transparent or semi-transparent synthetic resin, inserted into the opening of the main body unit 31 and fixed therein. The transmission unit 32 transmits projection light that is projected from the inside of the casing 2 toward the light reflecting unit 8 such as a windshield. The light reflecting unit 8 reflects the projection light toward the driver, and displays a virtual image in front of the driver.

As illustrated in FIG. 2, the planar mirror 9 of the present embodiment is disposed on the bottom surface of the casing 2. The planar mirror 9 includes a mirror main body 91 and a mirror covering unit 92. A reflecting surface 91a of the mirror main body 91 is a planar surface, and totally reflects the light from the projection light emission unit 4. The mirror covering unit 92 covers a part of the reflecting surface 91a. The mirror covering unit 92 exposes a region that the light from the projection light emission unit 4 enters, and covers the outside of the region into which the light from the projection light emission unit 4 enters, in the reflecting surface 91a. In other words, the mirror covering unit 92 causes the shape of the exposed portion of the reflecting surface 91a to be a shape corresponding to the shape of the projection light emitted from the projection light emission unit 4.

The reflecting member 5 reflects the projection light emitted from the projection light emission unit 4 toward the outside of the casing 2. The reflecting member 5 is disposed on an optical passage of the projection light that is reflected by the planar mirror 9. The reflecting member 5 is formed of a synthetic resin, and a reflection surface 51 is provided on one of the surfaces. For example, the reflection surface 51 is a thin metal film formed by vapor deposition. The reflection surface 51 is a concave surface, and totally reflects the projection light from the projection light emission unit 4.

The supporting member 6 rotatably supports the reflecting member 5. For example, the supporting member 6 is a bearing that rotatably supports both ends of a rotation axis 53 of the reflecting member 5. A rotation axis line O1 illustrated in FIG. 2 in an alternate long and short dash line is the center axis line of the rotation axis 53. The supporting member 6 rotatably supports the reflecting member 5 in both directions around the rotation axis line O1, in other words, in an R1 direction as well as an R2 direction.

The rotation power generating mechanism 7 rotates the reflecting member 5, and holds the reflecting member 5 at an optional rotating position. As illustrated in FIG. 2, the rotation power generating mechanism 7 includes a driving source 71 and a driving power transmission mechanism 72. The driving source 71 of the present embodiment is a motor. The driving power transmission mechanism 72 transfers the driving power of the driving source 71 to the rotation axis 53.

The projection light emission unit 4 projects an image of information relating to a vehicle traveling state, information to guide a vehicle to a destination, external environmental information, and the like. As illustrated in FIG. 2, a heat radiation member 14 is fitted on the rear surface of the projection light emission unit 4. The projection light emission unit 4 is disposed in an inclined manner so that the projection light emission unit 4 can project projection light toward the planar mirror 9. As illustrated in FIG. 3 and FIG. 4, the projection light emission unit 4 includes an image display unit 10, a backlight unit 40, a shield case 12, a heat transfer sheet 13, and the heat radiation member 14.

The image display unit 10 displays an image to be projected on the light reflecting unit 8, in other words, an image to be displayed in front of the driver as a virtual image. The image display unit 10 of the present embodiment is a light-transmission type display part through which the light is transmitted from the rear surface side to the front surface side. In the present embodiment, a thin film transistor (TFT) liquid crystal display part is used as the light-transmission type display part. The image display unit 10 includes a liquid crystal unit 11. The liquid crystal unit 11 is a light-transmission type display film that displays an image, and through which the light can be transmitted from the rear surface side to the front surface side.

The backlight unit 40 includes a first diffusion sheet 41, a housing 42, a diverging lens 43, a second diffusion sheet 44, a condensing lens 45, a holding member 46, and a light source unit 47. In the backlight unit 40 of the present embodiment, the holding member 46, the condensing lens 45, the second diffusion sheet 44, the diverging lens 43, and the first diffusion sheet 41 are arranged in this order, from the light source unit 47 toward the image display unit 10.

The light source unit 47 is a light source substrate, and as illustrated in FIG. 5, includes a substrate main body 47a and a plurality of light sources 47b. The substrate main body 47a of the present embodiment has a rectangular shape. The light sources 47b are disposed on the front surface of the substrate main body 47a. Each of the light sources 47b is a light emitting element, and for example, a light emitting diode (LED). For example, in the light source unit 47, the light sources 47b are arranged in a plurality of rows. In the light source unit 47 of the present embodiment, ten of the light sources 47b are arranged in two rows of five of the light sources 47b. More specifically, a single light source group 47c includes five of the light sources 47b that are arranged in a lateral direction. Two of the light source groups 47c are arranged in parallel in a longitudinal direction with an interval therebetween. In the projection light emission unit 4, the lateral direction and the longitudinal direction respectively correspond to the horizontal direction and the vertical direction of a virtual image that is to be displayed in front of the driver. In other words, the lateral direction and the longitudinal direction of the projection light emission unit 4 are directions corresponding to a vehicle width direction and a vehicle height direction, respectively. The substrate main body 47a includes a control circuit, which is not illustrated. The control circuit turns on and turns off the light sources 47b, and controls the amount of light of the light sources 47b.

The holding member 46 is a member that holds the condensing lens 45 and the second diffusion sheet 44. As illustrated in FIG. 6, the holding member 46 includes a main body unit 46a having a plate shape, columnar shaped projections 46b, 46c, and 46d, as well as a through hole 46e. In a plan view, the main body unit 46a is a structural unit having a rectangular plate shape. The columnar shaped projections 46b, 46c, and 46d are projections formed in a columnar shape that project from the main body unit 46a toward the front surface side. The columnar shaped projections 46b, 46c, and 46d of the present embodiment each have a cylindrical shape. The through hole 46e penetrates through the main body unit 46a in a plate thickness direction. The through hole 46e is provided at a position corresponding to each of the light sources 47b of the light source unit 47. In the holding member 46 of the present embodiment, ten of the through holes 46e are arranged in two rows of five of the through holes 46e. Each of the through holes 46e is formed in a tapered shape the sectional area of which is reduced toward the rear surface side from the front surface side. The sectional shape of the through hole 46e of the present embodiment is rectangular such as square.

As illustrated in FIG. 7, the condensing lens 45 includes a main body unit 45a having a plate shape and a plurality of lenses 45b. The main body unit 45a and the lenses 45b are integrally formed of a synthetic resin. Each of the lenses 45b is a convex lens projecting toward the front surface side, from the front surface of the main body unit 45a. The rear surface of the lens 45b is a planar surface. The lenses 45b correspond to the light sources 47b of the light source unit 47. For example, each of the lenses 45b is disposed on the same axis with that of each of the light sources 47b. In the condensing lens 45 of the present embodiment, ten of the lenses 45b are arranged in two rows of five of the lenses 45b.

Each of the lenses 45b condenses the light emitted from the corresponding light source 47b and generates parallel light. In other words, divergent light emitted from the light source 47b enters the condensing lens 45 from the rear surface side thereof, and is emitted from the front surface side of the corresponding lens 45b as parallel light. The main body unit 45a includes a through hole 45c. The through hole 45c is disposed at both ends in the lateral direction. Two of the through holes 45c are provided with a lens array 45d that is formed of the lenses 45b therebetween.

As illustrated in FIG. 8 and FIG. 9, the diverging lens 43 is a prism-shaped lens. The diverging lens 43 includes an incident surface 43a, an emission surface 43b, and a flange unit 43e. The flange unit 43e projects from the prism-shaped lens main body in a direction orthogonal to an optical axis C1. The flange unit 43e includes a through hole 43c and a notch 43d. The incident surface 43a illustrated in FIG. 8 is a surface that the light from the light source unit 47 enters, and the rear surface of the diverging lens 43. The diverging lens 43 is disposed in front of the lens array 45d so that the optical axis C1 of the diverging lens 43 is in parallel with the optical axis of the light source 47b. The emission surface 43b illustrated in FIG. 9 is a surface from which the light is emitted toward the image display unit 10, and is the front surface of the diverging lens 43.

The incident surface 43a and the emission surface 43b of the diverging lens 43 are both concave surfaces. In other words, as illustrated in FIG. 8, the incident surface 43a of the diverging lens 43 is curved so that the center portion is positioned relatively at the front surface side than the outer peripheral portion. More specifically, the incident surface 43a of the present embodiment is a concave curved surface. This will be explained with reference to FIG. 10. The sectional shape of the incident surface 43a at a cross-section in the longitudinal direction is a curved shape that curves toward the front surface side. The incident surface 43a is curved toward the front surface side, from both ends toward the center in the longitudinal direction. Furthermore, as illustrated in FIG. 11, the sectional shape of the incident surface 43a in the lateral direction is a curved shape that curves toward the front surface side. The incident surface 43a is curved toward the front surface side, from both ends toward the center in the lateral direction.

As illustrated in FIG. 9, the emission surface 43b of the diverging lens 43 is curved so that the center portion is positioned relatively at the rear surface side than the outer peripheral portion is. More specifically, the emission surface 43b of the present embodiment is a concave curved surface. This will be explained with reference to FIG. 10. The sectional shape of the emission surface 43b at a cross section in the longitudinal direction is a curved shape that curves toward the rear surface side. The emission surface 43b is curved toward the rear surface side, from both ends toward the center in the longitudinal direction. Furthermore, as illustrated in FIG. 11, the sectional shape of the emission surface 43b at a cross section in the lateral direction is a curved shape that curves toward the rear surface side. The emission surface 43b is curved toward the rear surface side, from both ends toward the center in the lateral direction.

As illustrated in FIG. 10 and FIG. 11, the emission surface 43b of the diverging lens 43 faces the rear surface of the liquid crystal unit 11. The light that is emitted from the emission surface 43b enters the liquid crystal unit 11, transmits through the liquid crystal unit 11, and becomes projection light traveling toward the light reflecting unit 8. In other words, the head-up display device 1 projects an image of the liquid crystal unit 11 on the light reflecting unit 8 with the light emitted from the diverging lens 43.

The first diffusion sheet 41 and the second diffusion sheet 44 illustrated in FIG. 4 each diffuse light. The first diffusion sheet 41 is disposed between the diverging lens 43 and the liquid crystal unit 11. The first diffusion sheet 41 diffuses the light emitted from the emission surface 43b of the diverging lens 43, and makes the light enter the liquid crystal unit 11. The second diffusion sheet 44 is disposed between the condensing lens 45 and the diverging lens 43. The second diffusion sheet 44 diffuses the light emitted from the condensing lens 45, and makes the light enter the incident surface 43a of the diverging lens 43. Consequently, in the projection light emission unit 4 of the present embodiment, the light emitted from the light source 47b of the light source unit 47 passes through the condensing lens 45, the second diffusion sheet 44, the diverging lens 43, the first diffusion sheet 41, and the liquid crystal unit 11, and is projected on the light reflecting unit 8.

The housing 42 is a casing in a tubular shape that accommodates the diverging lens 43, the second diffusion sheet 44, and the lens 45b of the condensing lens 45. The main body unit 45a of the condensing lens 45 is interposed between the holding member 46 and the housing 42. The columnar shaped projection 46b of the holding member 46 is inserted into the through hole 45c of the condensing lens 45 as well as a through hole 42a of the housing 42. Furthermore, the columnar shaped projections 46c and 46d of the holding member 46 are respectively inserted into a through hole 44a of the second diffusion sheet 44 and the through hole 43c of the diverging lens 43, as well as a notch 44b and the notch 43d, and hold the second diffusion sheet 44 as well as the diverging lens 43.

The shield case 12 includes a main body 12a and a fixing unit 12b. The main body 12a is a structural unit having a frame shape, and includes an opening 12c corresponding to the liquid crystal unit 11. The fixing unit 12b extends toward the rear surface side from the main body 12a. The fixing unit 12b is fixed to the heat radiation member 14 using a screw 15. The substrate main body 47a of the light source unit 47 and the heat transfer sheet 13 are interposed between the fixing unit 12b and the heat radiation member 14. Furthermore, the image display unit 10 and the first diffusion sheet 41 are interposed between the main body 12a and the front surface of the housing 42. The heat transfer sheet 13 is a sheet with high thermal conductivity. The heat transfer sheet 13 comes into contact with the rear surface of the light source unit 47, and transfers the heat generated by the light source 47b to the heat radiation member 14.

The heat radiation member 14 radiates the heat transferred from the light source unit 47 via the heat transfer sheet 13. The heat radiation member 14 includes a main body 14a having a plate shape and a fin 14b. The front surface of the main body 14a comes into contact with the heat transfer sheet 13. A plurality of the fins 14b are provided on the rear surface of the main body 14a.

Figure 12:
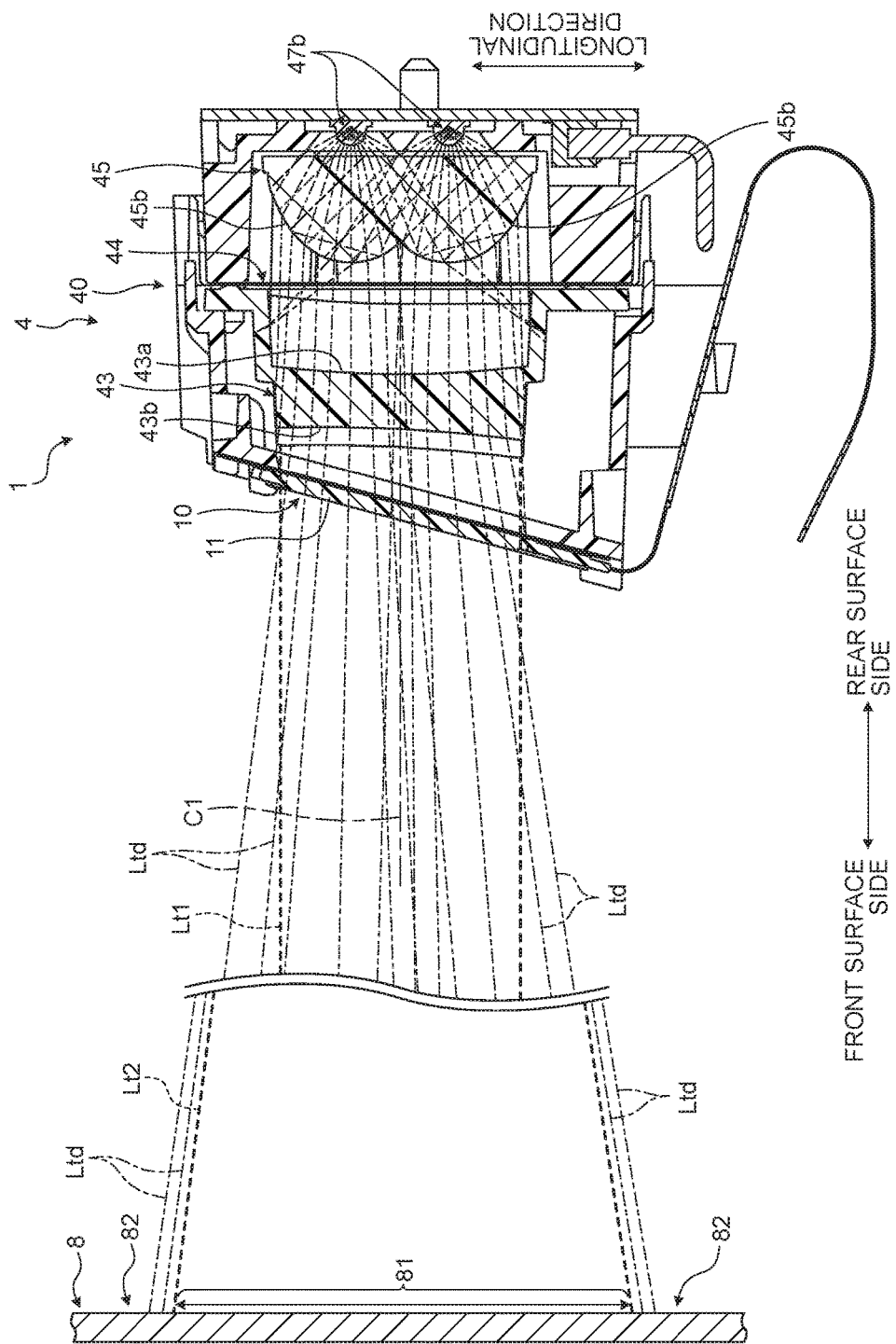
FIG. 12 is a longitudinal sectional view for explaining an operation performed by a backlight unit according to the embodiment.
Figure 13:
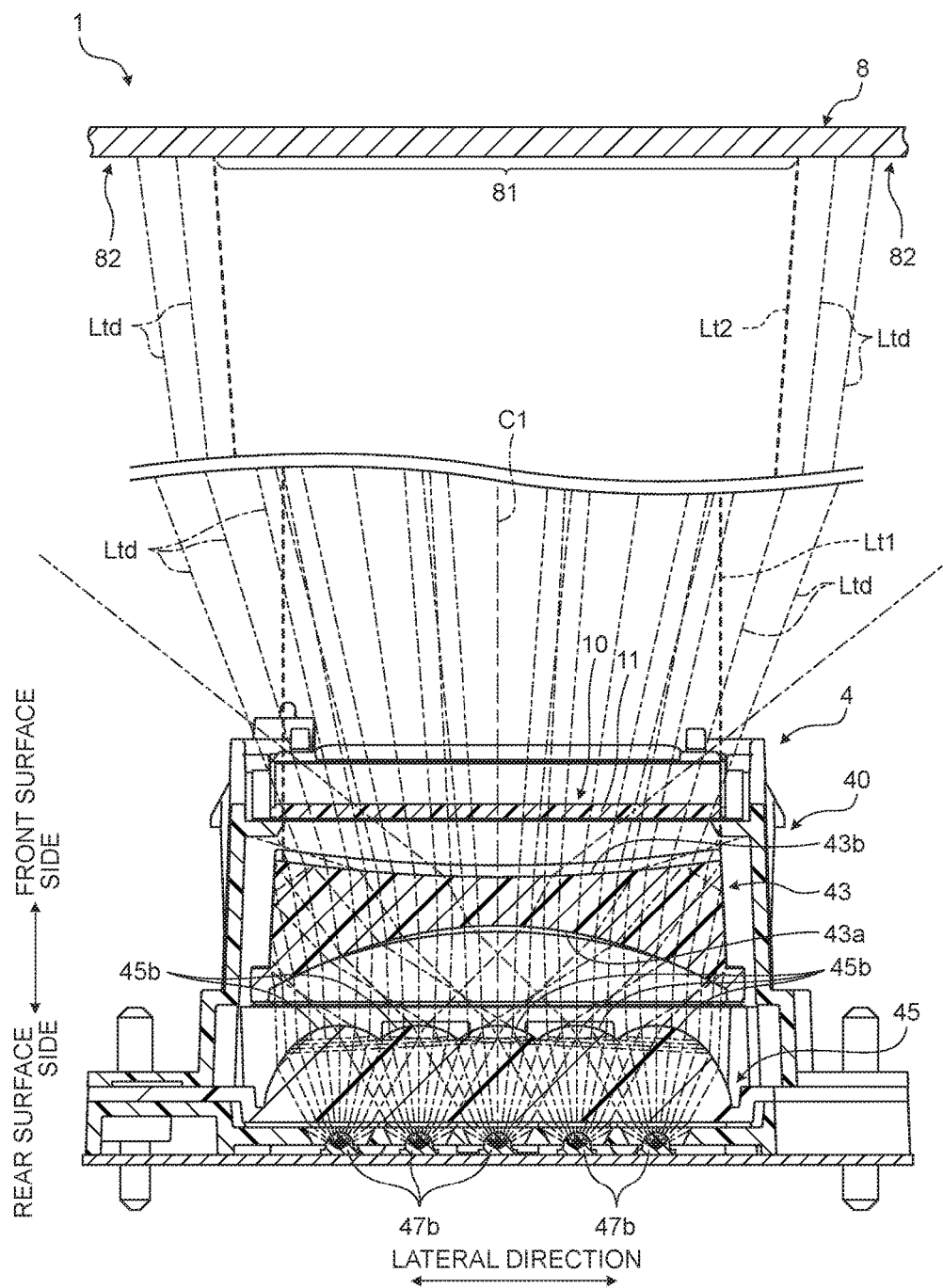
FIG. 13 is a lateral sectional view for explaining an operation performed by the backlight unit according to the embodiment.

An operation performed by the backlight unit 40 according to the present embodiment will now be described with reference to FIG. 12 and FIG. 13. As illustrated in FIG. 12 and FIG. 13, the light emitted from the light source 47b enters the lens 45b from the rear surface side. The light that has passed through the lens 45b is emitted from the front surface of the lens 45b. The light emitted from the front surface of the lens 45b is parallel light that is in parallel with the optical axis C1 of the diverging lens 43. In other words, the lens 45b refracts the divergent light emitted from the light source 47b, and generates parallel light that travels in parallel with the optical axis C1.

The parallel light emitted from the lens 45b enters the incident surface 43a of the diverging lens 43. The incident surface 43a generates divergent light by refracting the incident parallel light. In other words, the incident surface 43a refracts the incident light that enters from the side of the lens 45b in a direction separating from the optical axis C1. The light that has entered the diverging lens 43 via the incident surface 43a is emitted from the emission surface 43b. The emission surface 43b is curved so as to refract the light to be emitted in a diverging direction. In other words, when the light in parallel with the optical axis C1 enters from the incident surface 43a, the diverging lens 43 of the present embodiment refracts the incident light toward the diverging side relative to the optical axis C1, at both the incident surface 43a as well as the emission surface 43b. Consequently, when the parallel light that has entered the diverging lens 43 passes through the diverging lens 43, and is emitted from the emission surface 43b, the emission light is inclined and travels in the direction separating from the optical axis C1, as the emission light moves away from the emission surface 43b toward the front surface side.

The diverging lens 43 of the present embodiment diverges the incident parallel light in the longitudinal direction as well as the lateral direction. In other words, as illustrated in FIG. 12, the emission light from the diverging lens 43 is diverged in the longitudinal direction so as to separate from the optical axis C1, as the emission light moves away from the emission surface 43b. Furthermore, as illustrated in FIG. 13, the emission light from the diverging lens 43 is diverged in the lateral direction so as to separate from the optical axis C1, as the emission light moves away from the emission surface 43b. Consequently, as will be described in the following, it is possible to prevent luminance unevenness and luminance variation resulting from a shift in an eye point. The eye point is a visual position of the driver. As illustrated in FIG. 12 and FIG. 13, the light reflecting unit 8 includes a corresponding region 81. The corresponding region 81 is a region corresponding to a predetermined range relative to the eye point (hereinafter, referred to as a "predetermined range"). When the projection light from the projection light emission unit 4 is parallel light, the projection light travels without being diverged as illustrated in a broken line Lt1 in FIG. 12 and FIG. 13. The projection light is enlarged as illustrated in a broken line Lt2, by being reflected by the reflection surface 51 of the reflecting member 5, and is projected on the corresponding region 81. The corresponding region 81 reflects the projection light toward the predetermined range of the eye point. In other words, the corresponding region 81 is a region that reflects the parallel light projected from the projection light emission unit 4 to the predetermined range.

When the projection light from the projection light emission unit 4 is parallel light, the light from the light source 47b can be concentrated on the corresponding region 81. As a result, the light from the light source 47b can be concentrated on the predetermined range of the eye point. Consequently, it is possible to improve the luminance of a virtual image, when the virtual image is viewed from the eye point in the predetermined range.

On the other hand, the eye point may be deviated from the predetermined range due to a change of posture of the driver or the like. In this case, an image that the driver can view is an image reflected on a surrounding region 82 that is an outside portion of the corresponding region 81 of the light reflecting unit 8. When the projection light from the projection light emission unit 4 is parallel light, the difference of luminance in the projection light between the inside and outside of the corresponding region 81 is large, and the luminance in the surrounding region 82 is lower than that in the corresponding region 81. Thus, when the eye point is deviated from the predetermined range, the luminance of the virtual image becomes insufficient. This may cause the driver to feel uncomfortable.

The diverging lens 43 of the backlight unit 40 in the present embodiment diverges the parallel light that enters from the condensing lens 45. Thus, as illustrated by a reference character Ltd in FIG. 12 and FIG. 13, the light that is emitted from the emission surface 43b of the diverging lens 43 travels to the outside of the ranges Lt1 and Lt2 of the parallel projection light. Consequently, the projection light is not concentrated too much in the corresponding region 81, and is suitably dispersed in the surrounding region 82. In other words, the difference between the luminance in the corresponding region 81 and the luminance in the surrounding region 82 is small. Furthermore, in the light reflecting unit 8, the luminance is gradually reduced as the light moves away from the corresponding region 81. Consequently, the backlight unit 40 of the present embodiment can prevent the change in luminance, when an eye point is changed.

Figure 14:
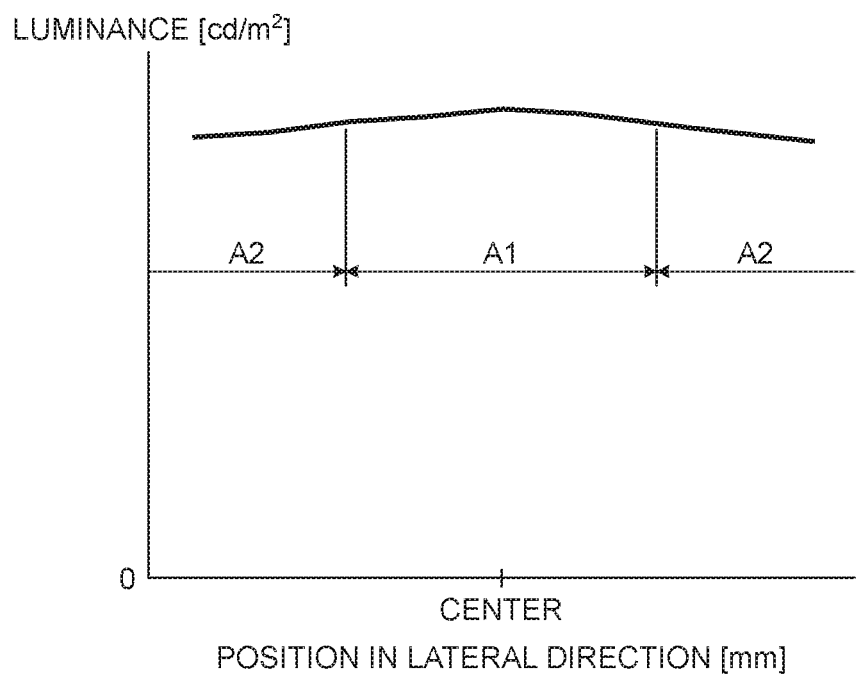
FIG. 14 is a diagram illustrating a luminance distribution according to the head-up display device of the embodiment.

FIG. 14 illustrates a luminance distribution according to the head-up display device 1 of the present embodiment. The luminance distribution in FIG. 14 indicates a relation between a position of an eye point in the lateral direction [mm] and luminance in the projection light measured at the position [cd/m²]. In FIG. 14, a first range A1 is a range corresponding to the corresponding region 81. Furthermore, a second range A2 is a range corresponding to the surrounding region 82. As illustrated in FIG. 14, there is no significant difference between the luminance in the first range A1 and the luminance in the second range A2. Furthermore, the luminance change is small relative to the position change in the lateral direction.

Figure 15:
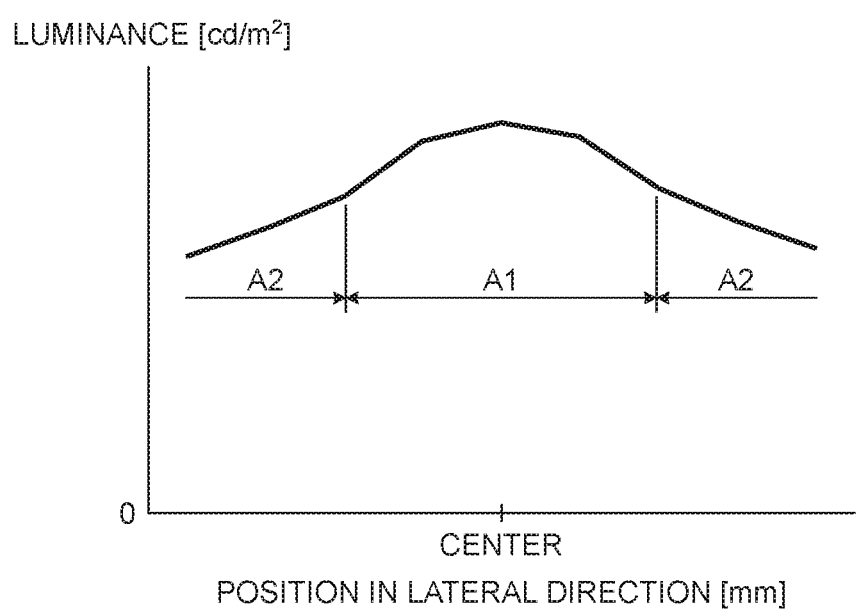
FIG. 15 is a diagram illustrating a luminance distribution of a comparative example.

The luminance distribution in FIG. 15 relates to a comparative example. In the comparative example, a predetermined lens that emits parallel light is used instead of the diverging lens 43 of the present embodiment. The projection light in the comparative example is parallel light. For example, the predetermined lens is a lens that enlarges the width of parallel light (width of projection light) to be emitted, relative to the width of incident parallel light. As illustrated in FIG. 15, in the comparative example, compared to that of the present embodiment, a large difference is generated between the luminance in the first range A1 and the luminance in the second range A2. Furthermore, the luminance change rate is large relative to the position change in the lateral direction.

In this manner, the backlight unit 40 of the present embodiment that includes the diverging lens 43, and the head-up display device 1 of the present embodiment that includes the backlight unit 40 can prevent luminance variation when an eye point is changed. For example, even if the eye point is moved from the inside of the predetermined range to the outside of the predetermined range, a significant luminance reduction hardly occurs. Consequently, it is possible to prevent the driver from feeling uncomfortable.

The diverging lens 43 of the present embodiment diverges light in the lateral direction as well as in the longitudinal direction. The degree of divergence of the light diverged by the diverging lens 43 in the lateral direction is larger than the degree of divergence of the light diverged by the diverging lens 43 in the longitudinal direction. Consequently, as will be described in the following, it is possible to prevent a change in luminance resulting from a change in an eye point, while suppressing an increase in output that is requested to the light source 47b. In general, it is assumed that the eye point changes easily in the vehicle width direction, and does not change easily in the vehicle height direction. It is assumed that the amount and frequency of change in the eye point in the vehicle width direction is larger than the amount and frequency of change in the eye point in the vehicle height direction. Thus, in the diverging lens 43 of the present embodiment, the divergence of light in the lateral direction is given priority to the divergence of light in the longitudinal direction. By preventing the light from diverging too much in the longitudinal direction, it is possible to prevent the increase in output of the light source 47b.

In this example, the degree of divergence of the light diverged by the diverging lens 43 is the degree of luminance change in the luminance distribution, for example. This will be explained with reference to FIG. 14. The degree of divergence of the light diverged by the diverging lens 43 in the lateral direction corresponds to the degree of luminance change relative to the position change in the lateral direction. It is assumed that the degree of luminance change relative to the position change in the lateral direction is reduced, in other words, the inclination angle of the luminance distribution curve is reduced, as the degree divergence of the of light diverged by the diverging lens 43 in the lateral direction is increased. Furthermore, the degree of divergence of the light diverged by the diverging lens 43 in the lateral direction corresponds to the luminance difference and luminance comparison between the luminance in the first range A1 and the luminance in the second range A2. In the diverging lens 43 of the present embodiment, the luminance difference in the lateral direction described above is smaller than the luminance difference in the longitudinal direction described above. In other words, the rate and amount of change in the luminance when an eye point is changed in the vehicle width direction, is smaller than the rate and amount of change in the luminance when the eye point is changed in the vehicle height direction.

As the structure in which the divergence degree of light differs in the longitudinal direction and the lateral direction, in the diverging lens 43 of the present embodiment, the shapes of the incident surface 43a and the emission surface 43b are determined as follows. In the diverging lens 43, the curvature radius of the incident surface 43a at a cross section in the lateral direction (FIG. 11) is smaller than the curvature radius of the incident surface 43a at a cross section in the longitudinal direction (FIG. 10). If the incident surface 43a has a non-spherical shape, it is preferable that the value of the curvature radius at the cross section in the lateral direction is smaller than the value of the curvature radius at the cross section in the longitudinal direction when compared at the same point on the incident surface 43a. Furthermore, in the diverging lens 43, the curvature radius of the emission surface 43b at a cross section in the lateral direction is smaller than the curvature radius of the emission surface 43b at a cross section in the longitudinal direction. If the emission surface 43b has a non-spherical shape, it is preferable that the value of the curvature radius at the cross section in the lateral direction is smaller than the value of the curvature radius at the cross section in the longitudinal direction when compared at the same point on the emission surface 43b.

As described above, the backlight unit 40 of the present embodiment includes the light source 47b, the condensing lens 45 that condenses light emitted from the light source 47b, and the diverging lens 43 that diverges and emits the light entering from the condensing lens 45 toward the light-transmission type image display unit 10 of the head-up display device 1. The backlight unit 40 of the present embodiment can prevent the luminance of a virtual image from being varied when an eye point is moved, by diverging the light using the diverging lens 43. For example, it is possible to prevent significant change in luminance, when an eye point is moved from the inside of the predetermined range to the outside of the predetermined range.

Furthermore, the diverging lens 43 of the present embodiment is a lens in which both surfaces of the incident surface 43a and the emission surface 43b are concave surfaces. The diverging lens 43 of the present embodiment can diverge the light using both of the incident surface 43a and the emission surface 43b. Consequently, it is possible to increase the overall divergence degree and the diverging angle of the diverging lens 43. When both surfaces of the incident surface 43a and the emission surface 43b are concave surfaces, one of the concave surfaces may have a shape capable of diverging light in the lateral direction, and the other concave surface may have a shape capable of diverging light in the longitudinal direction.

Furthermore, the diverging lens 43 of the present embodiment diverges light at least in the lateral direction. In this example, the lateral direction is a direction corresponding to the vehicle width direction in the image display unit 10, in other words, a direction corresponding to the lateral direction of the driver who is directly facing the light reflecting unit 8. Consequently, the diverging lens 43 of the present embodiment can prevent luminance variation in a virtual image when an eye point is moved in the vehicle width direction, when the posture of the driver is inclined or shifted in the lateral direction.

Furthermore, the diverging lens 43 of the present embodiment diverges light in the lateral direction as well as in the longitudinal direction. In this example, the longitudinal direction is a direction corresponding to the vehicle height direction in the image display unit 10, in other words, a direction corresponding to the longitudinal direction of the driver who is directly facing the light reflecting unit 8. The degree of divergence of the light diverged by the diverging lens 43 in the lateral direction is larger than the degree of divergence of the light diverged by the diverging lens 43 in the longitudinal direction. Consequently, in the diverging lens 43 of the present embodiment, the divergence of light in the lateral direction toward which the eye point moves easily is given priority. Thus, it is possible to prevent the output increase of the light source 47b, while securing the required luminance in the predetermined range, by preventing the divergence of light in the longitudinal direction or preventing light from diverging in the longitudinal direction, toward which the eye point does not move easily.

The head-up display device 1 of the present embodiment includes the light-transmission type image display unit 10, the light source 47b, the condensing lens 45 that condenses light emitted from the light source 47b, and the diverging lens 43 that diverges the light entering from the condensing lens 45 and that emits the light toward the image display unit 10. The head-up display device 1 projects an image of the image display unit 10 on the light reflecting unit 8 in front of the driver's seat with the light emitted from the diverging lens 43. In other words, the head-up display device 1 emits divergent light toward the image display unit 10 from the rear surface side thereof, and projects an image on the light reflecting unit 8 using the divergent light. Consequently, the head-up display device 1 of the present embodiment can prevent the luminance variation in a virtual image when the eye point is moved.

It is to be understood that the shape, the arrangement, the number, and the like of the condensing lens 45 is not limited to those described in the present embodiment. The condensing lens 45 may be integrally formed with the light source 47b. A condensing unit that condenses the light emitted from the light source 47b may be an optical system different from the condensing lens 45.

Modification of Embodiment

A modification of the embodiment will now be described. The shape and arrangement of the diverging lens 43 is not limited to those in the embodiment described above. In the embodiment described above, the value of the curvature radius of the incident surface 43a is smaller than the value of the curvature radius of the emission surface 43b. On the contrary, the value of the curvature radius of the emission surface 43b may be equal to or less than the value of the curvature radius of the incident surface 43a.

The diverging lens 43 may be a lens in which at least one of the incident surface 43a and the emission surface 43b is a concave surface. For example, in the diverging lens 43, at least one of the incident surface 43a and the emission surface 43b may be a planar surface. For example, in the diverging lens 43, the incident surface 43a may be a planar surface and the emission surface 43b may be a concave surface.

Furthermore, in the diverging lens 43, one of the incident surface 43a and the emission surface 43b may be a convex surface. In this case, the shapes (such as curvature radiuses) of the incident surface 43a and the emission surface 43b are determined so that the light entering from the condensing lens 45 can be diverted and emitted toward the image display unit 10. For example, when the incident surface 43a is a convex surface and the emission surface 43b is a concave surface, the value of the curvature radius of the emission surface 43b may be reduced than the value of the curvature radius of the incident surface 43a. In the diverging lens 43 in which the incident surface 43a is a convex surface and the emission surface 43b is a concave surface, the incident surface 43a having the convex surface may condense the divergent light entering from the light source 47b and generate parallel light, and the emission surface 43b having the concave surface may diverge the light.

A diverging unit that diverges the light entering from the condensing unit and that emits the light toward the image display unit 10 is not limited to the diverging lens 43. Another optical system that has a function of diverging light may be used instead of the diverging lens 43.

The contents disclosed in the above embodiment and modification may be executed by combining them suitably.

The backlight unit and the head-up display device according to the embodiment includes the light source; the condensing unit that condenses light emitted from the light source; and the diverging unit that diverges the light entering from the condensing unit and that emits the divergent light toward the light-transmission type image display unit in the head-up display device. The backlight unit and the head-up display device according to the embodiment can advantageously prevent luminance variation in an image due to a change of an eye point, by projecting an image of the image display unit using the divergent light.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A backlight unit, comprising:
a light source;
a condensing unit configured to condense light emitted from the light source; and
a diverging unit configured to diverge and emit the light entering from the condensing unit toward a light-transmission type image display unit in a head-up display device, wherein
the diverging unit diverges the light in a lateral direction that is a direction corresponding to a vehicle width direction, and a longitudinal direction that is a direction corresponding to a vehicle height direction, in the image display unit; and
a degree of divergence of the light diverged by the diverging unit in the lateral direction is larger than a degree of divergence of the light diverged by the diverging unit in the longitudinal direction.

2. The backlight unit according to claim 1, wherein
the diverging unit is a lens in which at least one of an incident surface that the light from the condensing unit enters and an emission surface from which the light is emitted toward the image display unit, is a concave surface.

3. The backlight unit according to claim 1, wherein
the diverging unit is a lens in which both surfaces of an incident surface that the light from the condensing unit enters as well as an emission surface from which the light is emitted toward the image display unit, are concave surfaces.

4. A head-up display device, comprising:
a light-transmission type image display unit configured to display an image;
a light source;
a condensing unit configured to condense light emitted from the light source; and
a diverging unit configured to diverge and emit the light entering from the condensing unit toward the image display unit, wherein
the image is projected on a light reflecting unit in front of a driver's seat with the light emitted from the diverging unit,
the diverging unit diverges the light in a lateral direction that is a direction corresponding to a vehicle width direction, and a longitudinal direction that is a direction corresponding to a vehicle height direction, in the image display unit, and
a degree of divergence of the light diverged by the diverging unit in the lateral direction is larger than a degree of divergence of the light diverged by the diverging unit in the longitudinal direction.

5. The backlight unit according to claim 1, wherein
the diverging unit is configured to diverge and emit the light such as to cause the head-up display device to instantaneously project an image that corresponds to an entire display of the head-up display device.

6. The head-up display device according to claim 4, wherein
the diverging unit is configured to diverge and emit the light such as to cause the head-up display device to instantaneously project the image, the image corresponding to an entire display of the head-up display device.

7. The backlight unit according to claim 5, wherein
the condensing unit is configured to be at a fixed distance from the diverging unit while the image corresponding to the entire display of the head-up display device is projected.

8. The head-up display device according to claim 6, wherein
the condensing unit is configured to be at a fixed distance from the diverging unit while the image corresponding to the entire display of the head-up display device is projected.

* * * * *